United States Patent
Yoshida

(10) Patent No.: US 8,974,739 B2
(45) Date of Patent: Mar. 10, 2015

(54) METHOD FOR PRODUCING POROUS FILM OR TAPE OF EXPANDED POLYTETRAFLUOROETHYLENE SUPPORTING CATALYST PARTICLES, AND OZONE-REMOVING FILTER

(75) Inventor: Kazumasa Yoshida, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 804 days.

(21) Appl. No.: 13/259,557

(22) PCT Filed: Mar. 18, 2010

(86) PCT No.: PCT/JP2010/055302
§ 371 (c)(1),
(2), (4) Date: Nov. 4, 2011

(87) PCT Pub. No.: WO2010/110404
PCT Pub. Date: Sep. 30, 2010

(65) Prior Publication Data
US 2012/0164035 A1    Jun. 28, 2012

(30) Foreign Application Priority Data
Mar. 25, 2009  (JP) ................ 2009-074617

(51) Int. Cl.
*B01D 53/66* (2006.01)
*B01D 53/34* (2006.01)
(Continued)

(52) U.S. Cl.
CPC ............ *B29C 67/20* (2013.01); *B01D 53/8675* (2013.01); *C08J 5/18* (2013.01); *C08J 7/04* (2013.01); *B29C 55/005* (2013.01); *B01D 2255/1021* (2013.01); *B01D 2255/1023* (2013.01); *B01D 2255/20707* (2013.01); *B01D 2255/2073* (2013.01); *B01D 2255/20761* (2013.01); *B01D 2255/2092* (2013.01); *C08J 2327/18* (2013.01); *B29B 15/122* (2013.01); *B29K 2027/18* (2013.01)

USPC ........... 422/177; 422/168; 422/171; 422/180; 422/211; 502/159; 502/339; 502/350; 502/324; 502/300

(58) Field of Classification Search
None
See application file for complete search history.

(56) References Cited

U.S. PATENT DOCUMENTS 5,849,235 A * 12/1998 Sassa et al. ................ 264/288.8
2009/0143624 A1   6/2009 DiCosimo et al.

FOREIGN PATENT DOCUMENTS

| JP | 4-235718 | 8/1992 |
| JP | 10-272367 | 10/1998 |

(Continued)

OTHER PUBLICATIONS

International Search Report from PCT/JP2010/055302 (1 page).

*Primary Examiner* — Walter D Griffin
*Assistant Examiner* — Jelitza Perez
(74) *Attorney, Agent, or Firm* — Amy L. Miller

(57) ABSTRACT

An improved method for producing an expanded polytetrafluoroethylene (PTFE) porous film or tape supporting catalyst particles.

The method for producing an expanded PTFE porous film or tape supporting catalyst particles according to the invention comprises a step of preparing tape-like porous PTFE, a step of impregnating the tape-like porous PTFE with a solution or dispersion of catalyst particles, a step of substantially removing the solvent or dispersing medium, and a step of further stretching the tape-like porous PTFE containing the catalyst particles in the machine direction (MD) and/or the transverse direction (TD).

8 Claims, 1 Drawing Sheet

(51) Int. Cl.
*B01J 31/06* (2006.01)
*B29C 67/20* (2006.01)
*B01D 53/86* (2006.01)
*C08J 5/18* (2006.01)
*C08J 7/04* (2006.01)
*B29C 55/00* (2006.01)
*B29B 15/12* (2006.01)
*B29K 27/18* (2006.01)

(56) References Cited

FOREIGN PATENT DOCUMENTS

| | | |
|---|---|---|
| JP | 2000-176293 | 6/2000 |
| WO | WO 96/34686 | 11/1996 |

* cited by examiner

METHOD FOR PRODUCING POROUS FILM OR TAPE OF EXPANDED POLYTETRAFLUOROETHYLENE SUPPORTING CATALYST PARTICLES, AND OZONE-REMOVING FILTER

TECHNICAL FIELD

The present invention relates to a method for producing a porous film or tape of expanded polytetrafluoroethylene (PTFE) supporting catalyst particles, and to an ozone-removing filter comprising the porous film.

BACKGROUND ART

Catalysts are used for a wide variety of purposes, for example for alteration of chemical compositions and for decomposition removal of contaminants. Common issues faced when using catalysts include how to maximize the catalyst area that can be used for reaction between the catalyst and the fluid to be treated, while easily and stably carrying, or immobilizing, the catalyst. Catalysts in the form of powders or other particulate forms are able to have maximum catalyst area, but catalytic power cannot be adequately exhibited unless the catalyst particles are oriented in such a manner that the fluid to be treated can flow freely over the entire catalyst area.

The use of expanded PTFE materials as base materials for containing and immobilizing catalyst particles is known (Patent document 1). An expanded PTFE material has a fine porous matrix structure comprising nodes and fibrils, and it allows stable immobilization of catalyst particles by entrapment of the catalyst particles in the interiors of the fine pores. According to Patent document 1, the expanded PTFE porous matrix provides an improved inner surface, or porosity, which allows the contact area between the fluid to be treated and the catalyst particles to be maximized for filtration purposes. An expanded PTFE porous matrix is also advantageous in that it is formed by mechanical stretching without using any chemical reagents such as foaming agents or pore generators, and it is therefore possible to avoid chemical contamination of the catalyst particles that are subsequently immobilized. In addition, since an expanded PTFE porous matrix usually has high mechanical properties including tensile strength, it has excellent manageability and can serve as a catalyst-housing base material with low risk of damage during use.

CITED LITERATURE

Patent Documents

Patent document 1: Japanese Patent Public Inspection HEI No. 11-505469

SUMMARY OF THE INVENTION

A base material housing catalyst particles as described in Patent document 1 is produced by first mixing a PTFE dispersion and catalyst particles to prepare a slurry, and then drying the slurry to form a powder, adding a lubricant to the powder to form a paste, and shaping the paste into a tape form by extrusion and rolling, and finally stretching the tape to form pores. In this prior art production method, however, the catalyst particles in the paste that is subjected to extrusion and rolling are a cause of defects in the molded article, or they can impair the molding workability. Furthermore, stretching the tape containing the catalyst particles does not allow a high draw ratio to be achieved, with the draw ratio being further lowered especially when defects are present, resulting in a porous matrix with insufficient strength.

It is therefore an object of the present invention to provide a method for producing an expanded PTFE porous film or tape supporting catalyst particles, wherein generation of defects during molding is minimized and the molding workability is satisfactory.

It is another object of the invention to provide a method for producing an expanded PTFE porous film or tape supporting catalyst particles, which allows high-ratio stretching, and thus further improved strength of the film or tape.

Other objects of the invention will become apparent from the description of the means for solving the problems and further descriptions below.

Means for Solving the Problems

According to the invention there is provided:

(1) a method for producing an expanded PTFE porous film or tape supporting catalyst particles, which comprises:
a step of preparing tape-like porous polytetrafluoroethylene (PTFE),
a step of impregnating the tape-like porous PTFE with a solution or dispersion of catalyst particles,
a step of substantially removing the solvent or dispersing medium, and
a step of further stretching the tape-like porous PTFE containing the catalyst particles in the machine direction (MD) and/or the transverse direction (TD).

According to the invention there is further provided:
(2) the method according to (1) above, wherein the tape-like porous PTFE is rendered porous by extrusion molding of a paste of the PTFE fine powder into a tape-like form, if necessary with further rolling of the extruded tape, and drying of the extruded tape.

According to the invention there is further provided:
(3) the method according to (2) above, wherein the tape-like porous PTFE is rendered porous by pre-stretching of the extruded tape in the MD or in the MD and TD, after the drying step.

According to the invention there is further provided:
(4) the method according to any one of (1) to (3) above, wherein the total draw ratio in the TD is in the range of 1.5-300.

According to the invention there is further provided:
(5) the method according to any one of (1) to (4) above, wherein the total draw ratio in the MD is in the range of 1.2-200.

According to the invention there is further provided:
(6) the method according to any one of (1) to (5) above, wherein the catalyst particles comprise at least one ozonolytic catalyst selected from the group consisting of manganese dioxide, copper oxide, titanium dioxide, platinum, palladium and alumina.

According to the invention there is further provided:
(7) an ozone-removing filter comprising an expanded PTPE porous film supporting ozonolytic catalyst particles, produced by the method according to (6) above.

Effect of the Invention

According to the invention, PTFE containing no catalyst particles is formed into a tape, and therefore the tape is resistant to defects during molding and the molding workability is satisfactory. Furthermore, since there are few or no defects in the molded tape of the invention, it is possible to subsequently accomplish high-ratio stretching, so that an expanded PTFE porous film or tape with relatively high strength can be obtained as a result. Moreover, since tape-like PTFE is stretched after the step of impregnation of the catalyst particles with a solution or dispersion of catalyst particles according to the invention, there is no film shrinkage by the solvent or dispersing medium as occurs when an expanded PTFE porous film is impregnated with catalyst particles, and a stable pore size is obtained. Furthermore, since catalyst particles are impregnated according to the invention, the catalyst particles can be evenly distributed in the PTFE porous film. Also according to the invention, the catalyst particle concentration of the catalyst particles in the solution or dispersion can be increased, thereby allowing the necessary amount of solvent or dispersing medium to be reduced and thus permitting energy savings for removal of the solvent or dispersing medium. In addition, according to the invention, the porous PTFE is in the form of a tape when the catalyst particles are impregnated, and therefore a wide impregnation device is not necessary for film impregnation and the production apparatus can be downsized.

MODE FOR CARRYING OUT THE INVENTION

Figure 1:
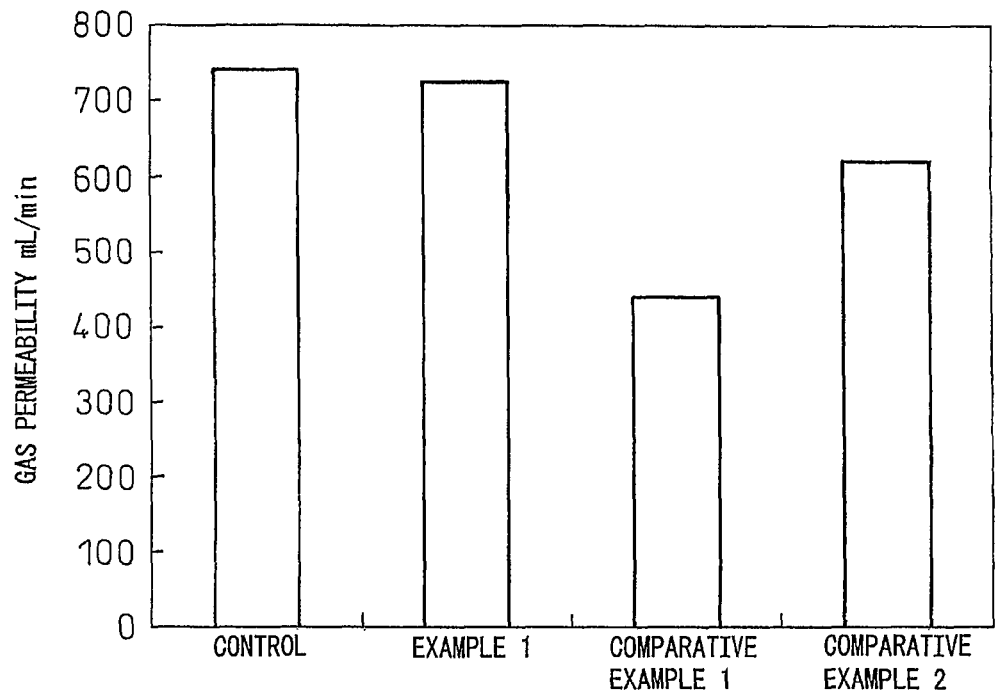
FIG. 1 is a bar graph showing gas permeability of each expanded PTFE porous film obtained in the examples and comparative examples.

The method for producing an expanded PTFE porous film or tape supporting catalyst particles according to the invention comprises a step of preparing tape-like porous PTFE, a step of impregnating the tape-like porous PTFE with a solution or dispersion of catalyst particles, a step of substantially removing the solvent or dispersing medium, and a step of further stretching the tape-like porous PTFE containing the catalyst particles in the MD and/or the TD.

Steps for preparing tape-like porous PTFE are themselves known, and for example, a tape-like porous PTFE may be prepared by the method described in Japanese Examined Patent Publication SHO No. 51-18991. Specifically, for example, a paste obtained by mixing a PTFE fine powder polymerized by dispersion polymerization or the like with a lubricant such as solvent naphtha or mineral spirit is extrusion molded into a tape form, and the extruded tape is dried to obtain a porous PTFE tape. The PTFE fine powder used may be a commercially available product such as POLYFLON$^R$ F-104 by Daikin Industries, Ltd. If necessary, the extruded tape may be rolled by a common method before drying to adjust the thickness of the extrusion molded tape. Next, the extruded tape or extruded/rolled tape may be dried at 200° C., for example, to remove the lubricant, to form pores in the tape-like PTFE.

When the properties described above cannot be achieved with a drying step alone, the drying step may be followed by pre-stretching of the extruded tape or the extruded/rolled tape in the MD or the MD and TD by a common method, to form pores. The pre-stretching factor may be any in a range allowing the aforementioned properties to be obtained, and will depend on the properties of the PTFE starting material, but generally it will be several times to about 20 times in the MD. The pre-stretching is generally carried out at a temperature near the melting point of the PTFE (250-350° C.). Pre-stretching may also be carried out in the TD, in which case the pre-stretching factor is preferably not too high, in consideration of reducing pore sizes by solvent contraction during the subsequent impregnation step. Details regarding the stretching method are described in Japanese Examined Patent Publication SHO No. 51-18991. Thus, since PTFE containing no catalyst particles is formed into a tape according to the invention, the tape is resistant to defects during molding and the extrusion or rolling workability is satisfactory. In addition, because the molded tape has virtually no defects, high-ratio stretching can be carried out in the stretching step after impregnation, and it is possible to obtain, at the end, an expanded PTFE porous film or tape with high strength. The properties of the tape-like porous PTFE before the impregnation step described hereunder may generally be in the range of a thickness of 0.02 mm-3 mm, a porosity of 20-95% and a mean pore size of 0.01-20 µm.

The tape-like porous PTFE prepared in this manner is then impregnated with a solution or dispersion of catalyst particles (hereunder referred to as "catalyst dispersion or solution"). There are no restrictions on the type of catalyst particles, and different types of catalyst particles may be used according to the purpose. As an example, when using an expanded PTFE porous film or tape supporting catalyst particles according to the invention as an ozone-removing filter, an ozonolytic catalyst such as manganese dioxide, copper oxide, titanium dioxide, platinum, palladium or alumina may be used alone or in combinations. Catalyst particles that may be used for the invention are not limited to ozonolytic catalysts, and a person skilled in the art reading the present specification will readily recognize other catalyst particles that may be employed.

The solvent or dispersing medium to be used in the catalyst dispersion or solution (hereunder referred to as "solvent or dispersing medium") is not particularly restricted so long as it satisfactorily dissolves or disperses the catalyst particles that are used, and for example, ethanol, propanol, hexane, water or the like may be used. Because a PTFE porous film naturally has excellent chemical resistance, the solvent or dispersing medium is not restricted from this viewpoint. On the other hand, since the PTFE porous film is essentially hydrophobic, it is preferred to use a hydrophobic solvent or dispersing medium to promote impregnation treatment. For even distribution of the catalyst particles in the PTFE porous film, it is preferred to use a solution of catalyst particles. When a dispersion of the catalyst particles is used, the particle sizes of the catalyst particles in the dispersion are preferably as small as possible, within a range such that the catalyst particles do not aggregate together, in order to evenly disperse the catalyst particles in the PTFE porous film. For example, the mean particle size of the catalyst particles in the dispersion is significantly smaller than the mean pore size of the tape-like porous PTFE to be impregnated, and it is preferably in the range of 0.001-0.1 µm. A dispersion aid such as citric acid may also be used for preparation of the dispersion of the catalyst particles.

The catalyst concentration in the catalyst dispersion or solution may be appropriately adjusted according to the catalyst loading weight desired for the expanded PTFE porous film that is to be finally obtained, in consideration of the draw ratio in the stretching step described hereunder. For example, when the film area is increased 10-fold by setting the draw ratio to a factor of 10 in the stretching step, the catalyst loading weight per unit area is reduced to $\frac{1}{10}$ from before stretching, and therefore it is preferred to use a high concentration of the catalyst dispersion or solution so that the catalyst is impregnated into the tape-like porous PTFE in an amount of 10-fold with respect to the expected catalyst loading weight. Specifically, the catalyst concentration in the catalyst dispersion or solution is preferably adjusted as desired within the range of 0.1-10 wt %. Thus, according to the invention, the catalyst concentration in the catalyst dispersion or solution can be increased, thereby allowing the necessary amount of solvent or dispersing medium to be reduced and permitting energy savings for removal of the solvent or dispersing medium in the subsequent steps. In addition, since the tape-like porous PTFE before the stretching step has a small impregnation area, bending of the PTFE by gravity is less than when an expanded PTFE porous film is supplied to the impregnation step, and this is also advantageous from the viewpoint of allowing more uniform impregnation to be accomplished.

The method for impregnating the catalyst dispersion or solution may be appropriately selected by a person skilled in the art from among methods of immersing the tape-like porous PTFE in the catalyst dispersion or solution, and methods of coating or blasting the catalyst dispersion or solution onto the tape-like porous PTFE. The impregnation step for the catalyst dispersion or solution may be carried out in an air atmosphere at room temperature, but preferably pressure reduction is applied to promote deaeration from the porous PTFE and penetration of the catalyst dispersion or solution into the pores.

After the tape-like porous PTFE has been impregnated with the catalyst dispersion or solution, the porous PTFE containing the catalyst is dried to substantially remove the solvent or dispersing medium. The drying may be carried out under conditions in which the solvent or dispersing medium used efficiently evaporates, and it may be appropriately selected by a person skilled in the art among methods of heating in an air atmosphere at a temperature above the boiling point of the solvent or dispersing medium, and methods of treatment at lower temperature with application of pressure reduction. By substantial removal of the solvent or dispersing medium, the catalyst particles uniformly deposit or attach onto the inner surfaces of the fine pores of the tape-like porous PTFE. In order to further increase the catalyst loading weight onto the tape-like porous PTFE, the impregnation step and solvent or dispersing medium removal step may subsequently be repeated one or more times.

According to the invention, the tape-like porous PTFE containing the catalyst particles obtained by the solvent or dispersing medium removal step is stretched in the MD and/or TD. The MD is the machine direction, and MD stretching refers to extension by stretching the tape-like porous PTFE in the lengthwise direction. The TD is the transverse direction, and TD stretching refers to widening by stretching the tape-like porous PTFE in the widthwise direction. Either MD stretching and TD stretching may be carried out alone, or when MD stretching and TD stretching are both carried out, they may be carried out simultaneously or in any order. A porous PTFE film can be formed from the tape-like porous PTFE by including TD stretching. TD stretching is preferably to a total draw ratio (when pre-stretching is performed, it includes the total factor including the pre-stretching factor, same hereunder) in the range of 1.5-300, and more preferably in the range of 3-200, based on the width of the tape at the time of extrusion. MD stretching is preferably to a total draw ratio in the range of 1.2-200, and more preferably in the range of 2-100, based on the length of the tape at the time of extrusion. An expanded PTFE porous film or tape having a total draw ratio in the preferred range has a fine porous matrix structure comprising nodes and fibrils, and the catalyst particles equally disperse inside the evenly distributed fine pores and are stably held. Also, the sizes of the fine pores through which the fluid that is to be treated passes, i.e., the mean pore size, can be easily controlled by varying the total draw ratio in the MD and/or TD to be within the range specified above. The expanded PTFE porous film or tape of the invention can exhibit properties in the range of, for example, a thickness of 0.001 mm-0.5 mm, a porosity of 5-95% and a mean pore size of 0.005-20 µm.

As mentioned above, the base material which houses catalyst particles as described in Patent document 1 has the catalyst particles mixed with a PTFE dispersion, with the obtained paste being formed into a tape by extrusion and rolling, after which the tape is stretched to form pores. That is, a high draw ratio cannot be achieved because the PTFE is stretched with the catalyst particles in the solid portion of the PTFE, and especially when defects are present caused by the catalyst particles during extrusion molding, the practically achievable draw ratio is even lower. However, with the method for producing an expanded PTFE porous film or tape supporting catalyst particles according to the invention, the PTFE is stretched with the catalyst particles attached not to the solid portion of the tape-like porous PTFE but rather to the inner surfaces of the fine pores, and therefore the presence of the catalyst particles has virtually no effect on high-ratio stretching of the PTFE. In addition, since no catalyst particles are present during extrusion molding by the method of the invention, almost no defects are found in the extruded tape, and subsequent high-ratio stretching can be accomplished, so that the obtained expanded PTFE porous film or tape has even higher mechanical strength, including tensile strength.

Stretching in the MD and/or TD after impregnation of the tape-like porous PTFE with the catalyst dispersion or solution according to the invention also has another important significance. When catalyst particles are to be loaded into porous PTFE, the procedure for impregnation of the catalyst dispersion or solution into the expanded PTFE porous film can sometimes be carried out after stretching in the MD and/or TD. However, the expanded PTFE porous film undergoes film shrinkage by contact with the solvent or dispersing medium of the catalyst dispersion or solution, potentially resulting in shrinkage of the pore sizes and reduced film strength. In addition, since the expanded PTFE porous film is very soft and prone to tearing, handling is difficult during impregnation of the catalyst dispersion or solution. However, in the method of the invention, the catalyst dispersion or solution is impregnated at the stage of the easily manageable tape-like porous PTFE, with the tape-like PTFE being stretched afterwards, and therefore no film shrinkage occurs due to the solvent or dispersing medium, a stable pore size is obtained, and high film strength can also be realized. The invention thus realizes a catalyst-supporting PTFE porous film exhibiting high mechanical strength not obtainable in the prior art, by the synergistic effect of impregnation of a catalyst dispersion or solution into the porous PTFE and a stretching step after impregnation.

EXAMPLES

The present invention will now be explained in greater detail by examples.

Example 1

Tape-like porous PTFE was prepared according to the method described in Japanese Examined Patent Publication SHO No. 51-18991. Specifically, 220 g of solvent naphtha (product of Idemitsu Kosan Co., Ltd.) was combined with 1000 g of PTFE fine powder (CD-123, Asahi Glass Co., Ltd.), and a PTFE fine powder paste was formed. The paste was packed into an extrusion molding machine and extruded into a tape with a width of 20 cm and a thickness of 1 mm. The extruded PTFE tape was continuously introduced into a drier for drying treatment at a temperature of 200° C., to remove the solvent naphtha. Next, the dried PTFE tape was continuously introduced into a stretching apparatus for pre-stretching to a draw ratio of 8 in the machine direction (MD) of the tape at a temperature of 300° C., to form pre-stretched PTFE porous tape, which was wound up.

After using a ball mill for pulverizing of 1 g of manganese dioxide ($MnO_2$) (product of Wako Pure Chemical Industries, Ltd.) as the catalyst particles, it was dispersed at a concentration of 1 wt/vol % in 1 L of ethanol to prepare a dispersion of the catalyst particles. The pre-stretched PTFE porous tape was wound out and continuously introduced into the aforementioned catalyst particle dispersion, and dipping treatment was carried out at room temperature with a residence time of 1 minute, for 0.1 g/m² adhesion of the catalyst particles onto the inner surfaces of the fine pores of the pre-stretched PTFE porous tape. The dipped pre-stretched PTFE porous tape was continuously introduced into a drier for drying treatment at a temperature of 120° C. with a residence time of 1 minute, for removal of the ethanol. Next, the dried, pre-stretched PTFE porous tape was continuously introduced into the stretching apparatus for stretching to a draw ratio of 10 in the transverse direction (TD) of the tape at a temperature of 300° C., to form an expanded PTFE porous film. The expanded PTFE porous film was then continuously heat treated at 380° C. for immobilization of the porous structure (heat setting), and then wound up. The amount of manganese dioxide adhesion in the obtained expanded PTFE porous film was 0.01 g/m².

Comparative Example 1

A pre-stretched PTFE porous tape was formed in the same manner as Example 1. Next, the pre-stretched PTFE porous tape was continuously introduced into the stretching apparatus for stretching to a draw ratio of 10 in the TD at a temperature of 300° C., to form an expanded PTFE porous film. The expanded PTFE porous film was then continuously heat treated at 380° C. for immobilization of the porous structure (heat setting), and then wound up.

A 0.1 g portion of the manganese dioxide, as catalyst particles, was dispersed at a concentration of 0.1 wt/vol % in 1 L of ethanol to prepare a dispersion of the catalyst particles. The expanded PTFE porous film was continuously introduced into the aforementioned catalyst particle dispersion, and dipping treatment was carried out at room temperature with a residence time of 1 minute, for 0.01 g/m² adhesion of the catalyst particles onto the inner surfaces of the fine pores of the expanded PTFE porous film. The dipped expanded PTFE porous film was continuously introduced into the drier for drying treatment at a temperature of 120° C. with a residence time of 1 minute, for removal of the ethanol.

Comparative Example 2

A 2 g portion of the manganese dioxide, as catalyst particles, was combined with 1000 g of the PTFE fine powder, to prepare a PTFE fine powder comprising 2 wt % manganese dioxide. Following the method described in Japanese Examined Patent Publication SHO No. 51-18991, 220 g of the solvent naphtha was combined with the PTFE fine powder at room temperature, and a PTFE fine powder paste was formed. The paste was packed into the extrusion molding machine and extruded into a tape with a width of 20 cm and a thickness of 1 mm. The extruded PTFE tape was continuously introduced into a drier for drying treatment at a temperature of 200° C., to remove the solvent naphtha. Next, the dried PTFE tape was continuously introduced into a stretching apparatus for pre-stretching to a draw ratio of 8 in the MD at a temperature of 300° C., to form pre-stretched PTFE porous tape, which was wound up. Next, the pre-stretched PTFE porous tape was continuously introduced into the stretching apparatus for stretching to a draw ratio of 10 in the TD at a temperature of 300° C., to form an expanded PTFE porous film. The expanded PTFE porous film was then continuously heat treated at 380° C. for immobilization of the porous structure (heat setting), and then wound up. The amount of manganese dioxide adhesion in the obtained expanded PTFE porous film was 0.01 g/m².

Control Example

An ordinary expanded PTFE porous film containing no catalyst was fabricated by the same procedure as Example 1, except for eliminating the step of impregnation with the catalyst particle dispersion and the drying step to remove the dispersing medium, and this was used as a reference sample.

(Gas Permeability)

The gas permeability of each expanded PTFE porous film of the examples, comparative examples and reference example was measured. The gas permeability was measured by anchoring the expanded PTFE porous film sample in an O-type jig with an inner diameter of 16 mm, and measuring the air flow passing through the film under 1.5 kPa pressure of air from the side of the film, with a film flow meter (FILM FLOW METER by Estec Co., Ltd.). The results are shown in FIG. 1. As seen in FIG. 1, Comparative Example 1 which had a catalyst dispersion impregnated in the expanded PTFE porous film exhibited notably lower gas permeability than Example 1. Comparative Example 2 which had catalyst particles added to the PTFE fine powder paste also exhibited significantly lower gas permeability than Example 1. On the other hand, Example 1 in which the stretching step was conducted after impregnation of the catalyst dispersion or solution into the tape-like porous PTFE, had gas permeability equal to the ordinary expanded PTFE porous film (control) which contained no catalyst particles.

(Tensile Strength)

Figure 2:
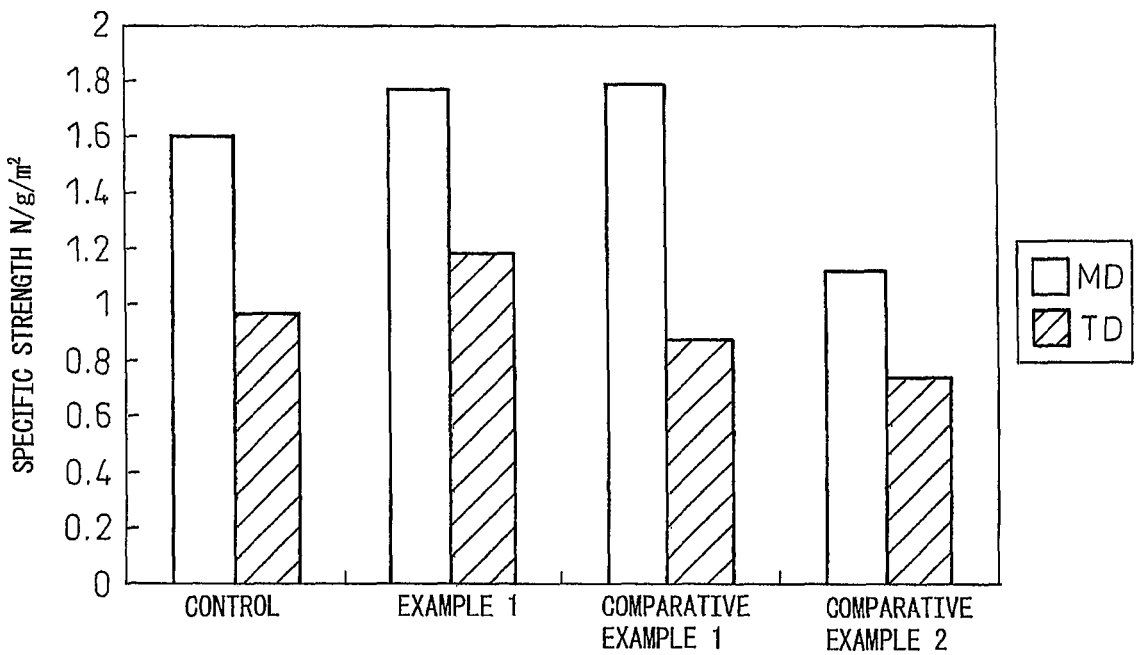
FIG. 2 is a bar graph showing specific strength in the MD and TD for each expanded PTFE porous film obtained in the examples and comparative examples.

The tensile strength of each expanded PTFE porous film of the examples, comparative examples and reference example was measured. The tensile tester used was an AG-1 by Shimadzu Corp., and the test piece shape was a #5 test piece according to JIS K 7127-1989. The chuck distance for the tensile test was 80 mm, and the tensile strength in the MD and TD for each sample was measured under test conditions with a pull rate of 200 mm/min, a temperature of 23° C. and a humidity of 50% RH. The results are shown in FIG. 2. As seen in FIG. 2, Comparative Example 2 which had catalyst particles added to the PTFE fine powder paste had notably lower tensile strength in both the MD and TD, compared to Example 1. Also, Comparative Example 1, with a catalyst dispersion impregnated in the expanded PTFE porous film, had significantly lower tensile strength than Example 1, especially in the TD. On the other hand, Example 1 in which the stretching step was conducted after impregnation of the catalyst dispersion or solution into the tape-like porous PTFE, had significantly higher tensile strength in both the MD and TD, compared to the ordinary expanded PTFE porous film (control) which contained no catalyst particles.

(Ozonolytic Power)

The expanded PTFE porous films of the examples, comparative examples and reference example were used to fabricate ozone-removing filters for measurement of the ozonolytic power. The expanded PTFE porous film was cut to a size of 25 cm×5 m, and a thermoplastic adhesive (HM712 by Cemedine Co., Ltd.) was used to attach it to one side (25 cm×5 m) of a tempered aluminum foil (product of Toyo Aluminium, KK.) having a thickness of 0.08 mm. Next, the laminated porous film/foil was cut into a 20 mm-wide strip and then a gear-type pleating machine was used for pleating to form pleat heights of approximately 1.8 mm. The pleated layer was placed over a straight non-pleated layer, and the two layers were wound up as a helical filter with a diameter of about 50 mm. This configuration produced 2.54 mm pressure loss with a water column at a 50 m/min air flow rate. Ozone gas-containing air at 1 ppm was introduced into the filter at an air speed of 50 m/min. The room temperature during the test was kept at 21-24° C., and the humidity in the test chamber was kept below 10% RH during the test. The ozone gas generator used was an Orec Model VI-0 Ozonator (acquired from Orec, Phoenix, Ariz.), and ozone was generated in the gas flow and passed through the filter at a concentration of 1 ppm with a flow rate of 50 m/min. The ozone gas measuring device used was an Orec Model DM-100 monitor, and the ozone concentration was measured upstream and downstream from the filter, determining the ozonolysis rate by the amount of reduction. The results are shown below.

Ozonolysis rate
Control 0%
Example 1 91%
Comparative Example 1 76%
Comparative Example 2 79%

The control contained no manganese dioxide, and therefore the ozonolysis rate was 0%. Comparative Example 1, which had a catalyst dispersion impregnated in the expanded PTFE porous film, and Comparative Example 2, which had catalyst particles added to the PTFE fine powder paste, both had significantly lower ozonolysis rates compared to Example 1. On the other hand, Example 1 in which the stretching step was conducted after impregnation of the catalyst dispersion or solution into the tape-like porous PTFE, exhibited a high ozonolysis rate of 91%.

INDUSTRIAL APPLICABILITY

The present invention can be used in a variety of technical fields in which immobilization of catalysts is necessary. In particular, the invention can notably contribute to industrial development, since it allows high catalytic activity to be realized while maintaining the original high mechanical properties and chemical resistance of expanded PTFE porous films.

What is claimed is:

1. A method for producing an expanded PTFE porous film or tape supporting catalyst particles, said method comprising:
    impregnating a porous polytetrafluoroethylene (PTFE) tape with a dispersion of catalyst particles within a dispersing medium,
    removing the dispersing medium, and
    stretching the porous PTFE tape containing the catalyst particles in a machine direction (MD), a transverse direction (TD), or in both the machine and transverse directions.

2. The method according to claim 1, further comprising forming said polytetrafluoroethylene tape, said forming comprising:
    extrusion molding a paste of polytetrafluoroethylene (PTFE) fine powder into an extruded tape;
    drying said extruded tape; and
    stretching said dried extruded tape to form said porous polytetrafluoroethylene tape.

3. The method according to claim 2, wherein said stretching occurs in the machine direction (MD) or in the both machine direction (MD) and the transverse direction (TD) after said drying.

4. The method according to claim 1, wherein a total draw ratio in the TD is in the range of 1.5-300.

5. The method according to claim 1, wherein a total draw ratio in the MD is in the range of 1.2-200.

6. The method according to claim 1, wherein the catalyst particles comprise at least one ozonolytic catalyst selected from the group consisting of manganese dioxide, copper oxide, titanium dioxide, platinum, palladium, alumina and combinations thereof.

7. An ozone-removing filter comprising an expanded PTFE porous film supporting ozonolytic catalyst particles produced by the method according to claim 1,
    wherein the catalyst particles comprise at least one ozonolytic catalyst selected from the group consisting of manganese dioxide, copper oxide, titanium dioxide, platinum, palladium, alumina and combinations thereof.

8. The method according to claim 1, wherein said dispersing medium comprises a member selected from the group consisting of ethanol, propanol, hexane and water.

* * * * *